(12) United States Patent
Geer

(10) Patent No.: US 7,312,690 B1
(45) Date of Patent: Dec. 25, 2007

(54) TEMPERATURE SENSOR

(75) Inventor: David Geer, Johnsonburg, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/614,243

(22) Filed: Dec. 21, 2006

(51) Int. Cl.
*H01C 7/10* (2006.01)
*H01C 7/13* (2006.01)

(52) U.S. Cl. .................. 338/22 R; 338/20; 252/519.1; 361/126

(58) Field of Classification Search ............. 338/22 R, 338/25, 20–21, 28, 260; 252/519.1, 518.1, 252/500; 361/56, 126
See application file for complete search history.

(56) References Cited

U.S. PATENT DOCUMENTS 5,046,857 A * 9/1991 Metzger et al. ............. 374/135
5,999,081 A * 12/1999 Hannigan et al. ............. 338/28
6,292,338 B1 * 9/2001 Bernhoff et al. ............. 361/58
6,490,158 B1 * 12/2002 Ellyson et al. ............. 361/690

* cited by examiner

*Primary Examiner*—K. Richard Lee
(74) *Attorney, Agent, or Firm*—GE Global Patent Operation

(57) ABSTRACT

A temperature sensor includes a probe section for insertion into a hot zone. The probe section includes a thermistor, a first lengthy pin terminating at the thermistor, and a second lengthy pin also terminating at the thermistor. A housing section is on one end of the probe section and outside of the hot zone. The housing section includes a first spring which biases the first pin into contact with the thermistor, a second spring which biases the second pin into contact with the thermistor, a first electrical contact engaged with the first spring, and a second electrical contact engaged with the second spring.

20 Claims, 8 Drawing Sheets

TEMPERATURE SENSOR

FIELD OF THE INVENTION

This subject invention relates to temperature sensors including thermistors.

BACKGROUND OF THE INVENTION

Various types of devices are utilized as temperature sensors to measure the temperature of different environments. In high temperature areas or "hot zones", operation of such devices is problematic. One portion of the temperature sensor, such as a thermistor, must be placed in the hot zone to detect the temperature, and even in the hot zone there may be large and frequent temperature variations. Measurement or control circuitry and lead wires must be placed outside of the hot zone—i.e., in a low temperature zone—to prevent damage. Nonetheless, there must be some portion of the sensor which traverses both zones to maintain an electrical connection between the thermistor and the associated circuitry.

Those skilled in the art have attempted to provide relief from excessive stress and strain caused by the high temperatures and sizeable operating temperature ranges. One known technique matches as closely as possible the temperature coefficient of the materials used in all portions of the temperature sensor. Another known technique includes extra material or wire to account for stresses and strains resulting from large temperature fluctuations. Such efforts result in a more costly temperature sensor, however, and/or a temperature sensor which still may degrade and become unreliable after a relatively short period of time, due to the effects of high temperature and frequent temperature excursions. In but one example, automobile exhaust temperature sensors are placed in an operating area or hot zone which reach temperatures as hot as 1000° C., as used in diesel filter trap regeneration applications. Large temperature excursions from 1000° C. or higher, to as low as the surrounding ambient temperature, can occur several times a day. Other attempts to solve the problem, such as the use of thermocouple sensors, have also been found to be costly and less than satisfactory overall.

SUMMARY OF THE INVENTION

Embodiments of this invention provide a cost-effective, more robust and reliable temperature sensor capable of withstanding high temperatures and large fluctuations in temperature which would otherwise cause damage, reduce performance, or render the temperature sensor ineffective.

In the various embodiments of this invention, the temperature sensor includes a device such as thermistor to be placed in a high temperature area or "hot zone" to measure temperature, pins in contact with the thermistor, and springs disposed outside of the hot zone to bias the pins against the thermistor to maintain a continuous connection between the thermistor, the pins, and the associated wires or circuitry also located outside of the hot zone. The embodiments of the applicant's invention thus provide a temperature sensor better able to withstand high temperatures and large variations in temperature, resulting in improved performance.

The invention embodiments, however, need not achieve all these objectives and results and the claims hereof should not be limited to structures or methods capable of achieving these objectives and results.

This invention features a temperature sensor including a probe section for insertion into a hot zone. The probe section includes a thermistor, a first lengthy pin terminating at the thermistor, and a second lengthy pin also terminating at the thermistor. A housing section is on one end of the probe section and outside of the hot zone. The housing section includes a first spring which biases the first pin into contact with the thermistor, a second spring which biases the second pin into contact with the thermistor, a first electrical contact engaged with the first spring, and a second electrical contact engaged with the second spring. In one configuration, the first pin includes a distal inwardly depending seat for the thermistor, and is made of metal, which may be a nickel, chromium and iron alloy. The second pin may include a conductive trace within an insulative shell, and the conductive trace may include platinum. The insulative shell may be made of ceramic material. In one variation, the housing section includes a spindle with a seat and a post and the first spring is disposed about the post, and the first pin includes a proximate inwardly depending ring disposed over the post abutting the first spring. The inwardly depending ring and the first spring may be connected via a compression fit. The first electrical contact may include a ring disposed about the post under the first spring and a first tab extending through the seat. In one example, the second electrical contact may fit within the second spring and extend through the post and the seat terminating in a second tab, and the second spring and the second electrical contact may be engaged via compression. The housing section may further include first and second conductors secured to the first and second electrical contacts, respectively. The first and second conductors may be wires. In one embodiment the thermistor is a negative temperature coefficient thermistor. The post may include alumina, and the tabs may include a gold-plated base metal.

This invention also features a temperature sensor including a probe section which includes a negative temperature coefficient thermistor, a first lengthy conductive pin terminating at the thermistor, and a second lengthy pin including a conductive trace within an insulative shell also terminating at the thermistor. A housing section is on one end of the probe section. The housing section includes a first spring which biases the first pin into contact with the thermistor, a second spring which biases the second pin into contact with the thermistor, a first electrical contact engaged with the first spring, a second electrical contact engaged with the second spring, a first conductor secured to the first electrical contact, and a second conductor secured to the second electrical contact.

This invention further features a temperature sensor including a probe section which includes a thermistor, a first lengthy pin terminating at the thermistor including a proximate inwardly depending ring, and a second lengthy pin also terminating at the thermistor. A housing section on one end of the probe section includes a first spring which biases the first pin into contact with the thermistor, a post disposed under the inwardly depending ring of the first pin and abutting the first spring, and a second spring which biases the second pin into contact with the thermistor. A first electrical contact includes a ring disposed about the post under the first spring. A second electrical contact is engaged with the second spring and extends through the post.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
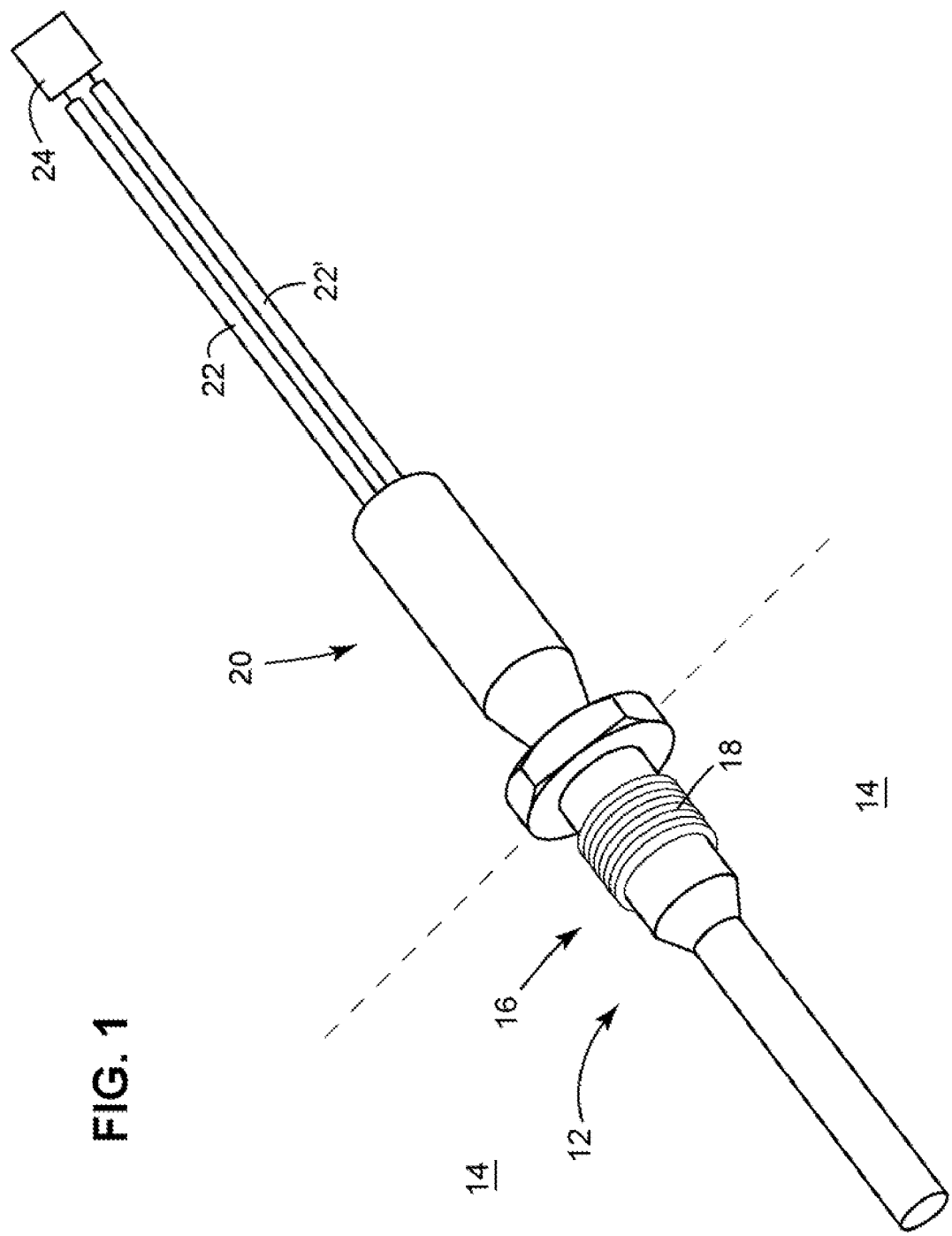
FIG. 1 is a three-dimensional schematic view of an embodiment of a temperature sensor in accordance with the present invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Temperature sensors which are subjected to very high temperatures and frequently undergo extreme temperature variations often degrade and/or consequently become ineffective over time, as discussed in the Background section. The subject invention offers an improved temperature sensor better able to withstand such extreme conditions.

In one aspect of the invention, temperature sensor 10, FIG. 1 includes probe section 12 for insertion in hot zone 14. As used herein, a hot zone is an area where the temperature is to be measured and which typically reaches temperatures high enough to adversely affect components of the temperature sensor as discussed in more detail below. In some circumstances, such as with automobile exhaust temperature measurement or in fuel cells, for example, temperatures in the hot zone may reach 1000° C. or greater. Also, as known to those skilled in the art, temperature excursions are typically large. The temperature in a hot zone, such as an automobile exhaust for example, may rise to greater than 1000° C., but then may drop to the temperature of the ambient environment, which may be much less than 150° C. It is in such environments and under such conditions that embodiments of temperature sensor 10 in accordance with the present invention may be utilized, although this is not a limitation of the invention. It should be noted that the dotted line as shown in FIG. 1 to depict hot zone 14 is exemplary only, and except for the components discussed in more detail below, some components, such as outer casing 16 and optional threads 18 for screwing temperature sensor 10 into place, may be within or outside of the hot zone as desired for a particular application.

Temperature sensor 10 includes housing section 20 on one end of probe section 12. Housing section 20 is preferably outside of hot zone 14, as are wires or other suitable electrical conductors 22, 22' which extend from temperature sensor 10 and connect to circuitry 24, such as measurement and/or control circuitry. Wires or conductors, as well as circuitry 24, will typically be outside of the hot zone to prevent damage to these components. Probe section 12, FIG. 2 includes temperature sensing device such as a thermistor 26 for insertion into the hot zone, and lengthy pin or post 28 terminating at thermistor 26. Lengthy pin or post 30 also terminates at device or thermistor 26. In one example, temperature sensing device 26 is a negative temperature coefficient (NTC) or disk type thermistor, including electrodes 27 and 27' on each side contacting pins 28 and 30 respectively. In one variation, the thermistor may be an yttrium chromite chromia thermistor as disclosed in U.S. Pat. Nos. 6,204,748 and 6,136,231, each of which are incorporated herein by reference. These are not limitations of the invention, however, and the device or thermistor may be any suitable type as desired for a particular application. Lengthy pins 28 and 30 may be fully or partially in the hot zone as desired for a particular application, although in most instances the pins will be fully or almost fully within the hot zone, with only a portion which is in connection with the springs, discussed more fully below, outside of the hot zone. Pin 28 are typically conductive and may be made of metal such as Inconel®, 300 series stainless steel, or other suitable material depending on temperatures. Inconel®, an alloy of nickel, chromium, and iron may be used for very high temperatures near or greater than 1000° C. for example, while stainless steel or other materials may be used for lower, but still hot, temperatures. In one configuration, temperature sensor 10 also includes an outer insulator 32 which may be made of any suitable insulative material, such as ceramic in one variation. Since pins 28 and 30 are made up of or at least partially include metal, outer insulator 32 will lessen or minimize the effects of high temperature on the metal portion of pins 28 and 30.

Figure 3:
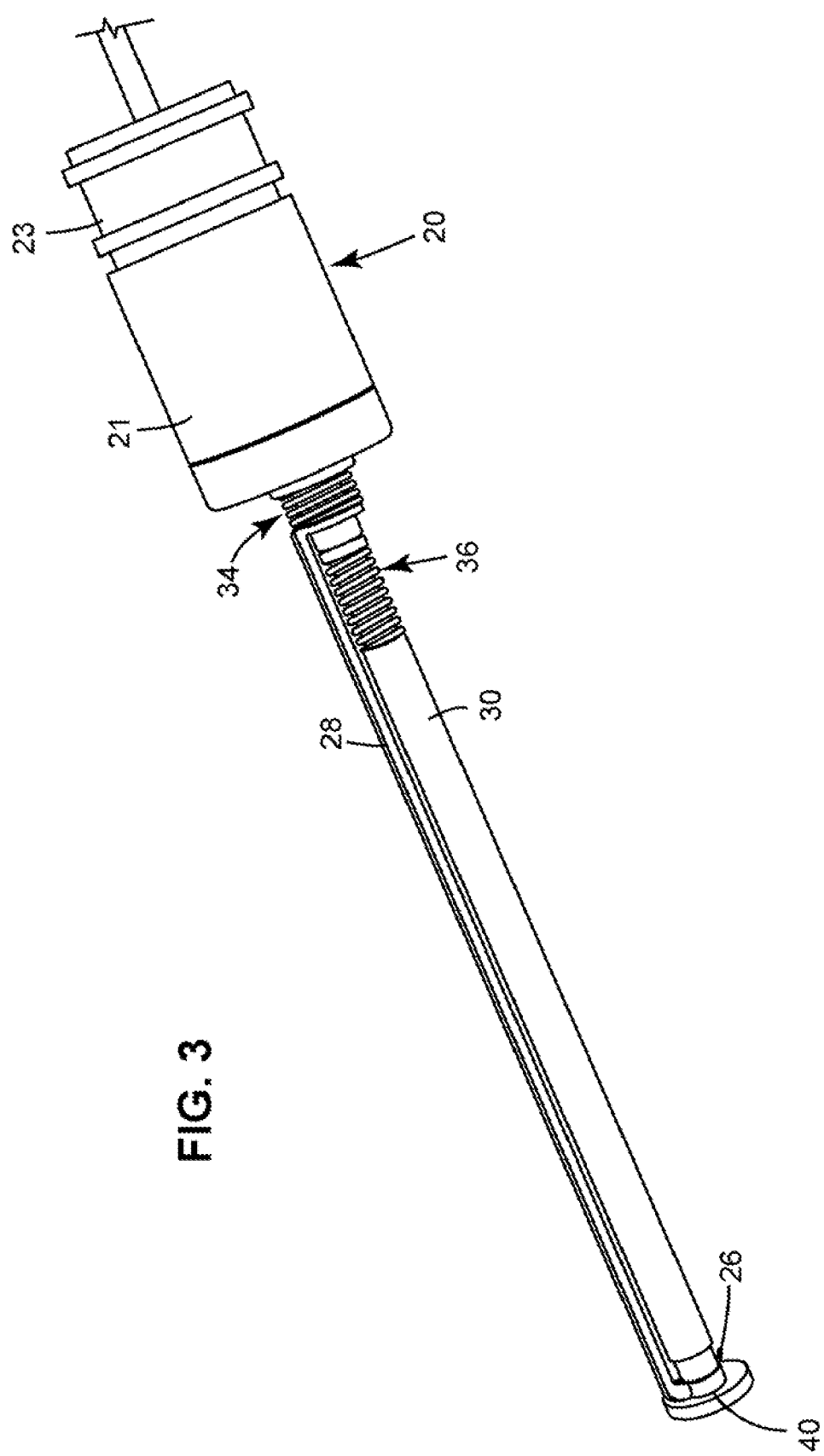
FIG. 3 is a more detailed cutaway schematic view showing an embodiment of pins and springs in a temperature sensor in accordance with the present invention.

Housing section 20 includes spring 34 and spring 36. Spring 34, FIG. 3 contacts and biases pin 28 into contact with thermistor 26, and spring 36 contacts and biases pin 30 into contact with thermistor 26. Springs 34 and 36 are in housing portion 20 outside the hot zone to help maintain the springs' physical properties, which could change if subjected to the same temperatures and/or variations as the thermistor. Without springs 34 and 36 biasing and maintaining pressure on pins 28 and 30 so as to contact thermistor 14, there could be a risk that the pins would separate from the thermistor, breaking the electrical connection and causing intermittent signals because of expansion and contraction of the pins (as well as the outer casing of the probe) due to high temperature and/or temperature fluctuations in the hot zone. A similar risk could arise if the springs were in the hot zone, because of high temperatures and with frequent large temperature variations the elasticity and spring characteristics may not be maintained.

Additionally, the majority of the stresses and strains created by large temperature excursions are accommodated by springs 34 and 36. Springs 34 and 36 can be designed to flex many orders of magnitude more than the excess wire strain relief of known mechanisms as discussed in the Background above. Springs 34 and 36 may be made of standard materials, for example chromium steel or beryllium copper, and in one configuration springs 34 and 36 are gold-plated to help ensure good electrical connections. Also, in one variation, housing portion 20 may include a further insulation portion 21, as well as a seal 23 such as a rubber seal or grommet, to assist to isolate the sensor's internal construction from external environmental conditions.

Figure 2:
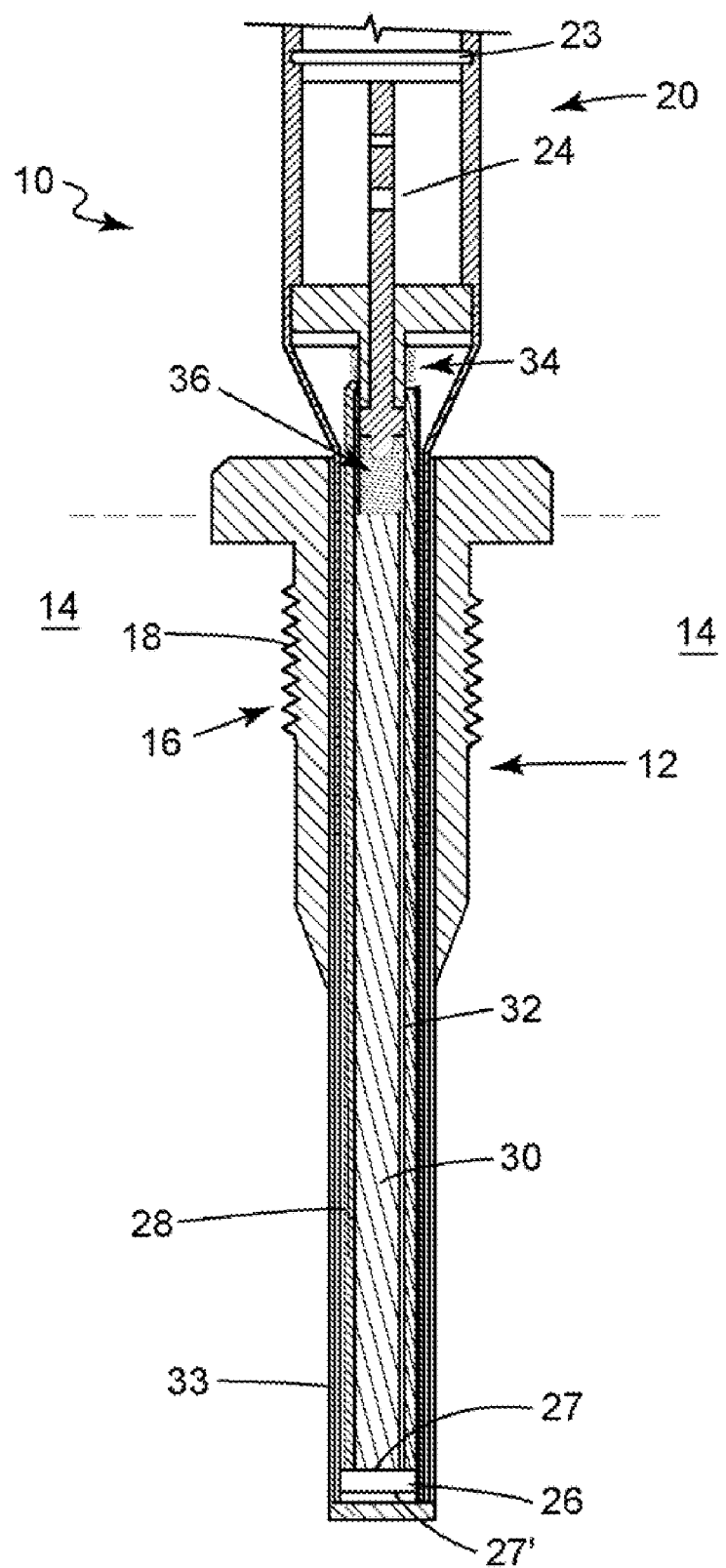
FIG. 2 is a partial cross-sectional view of the temperature sensor shown in FIG. 1.
Figure 4:
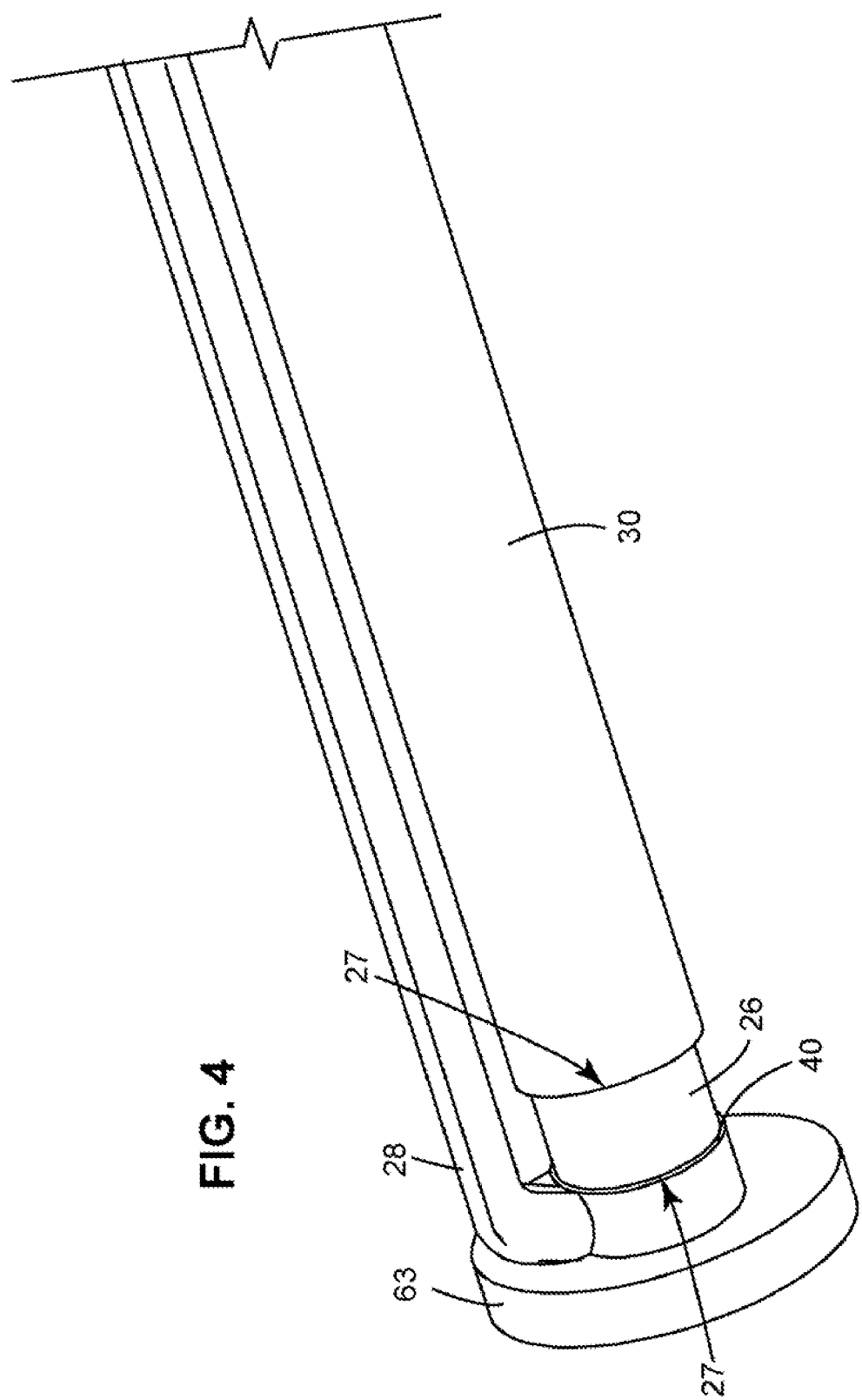
FIG. 4 is an enlarged schematic view of one section of the embodiment shown in FIG. 3.

In one example, pin 28 includes distal inwardly depending seat 40, FIG. 4 for thermistor 26, and an isolation component 63, for providing isolation between pin 40 and outer casing 16, FIG. 2. In one example, isolation component 63 is made of alumina, but it may be made of any other suitable insulative material.

Figure 5:
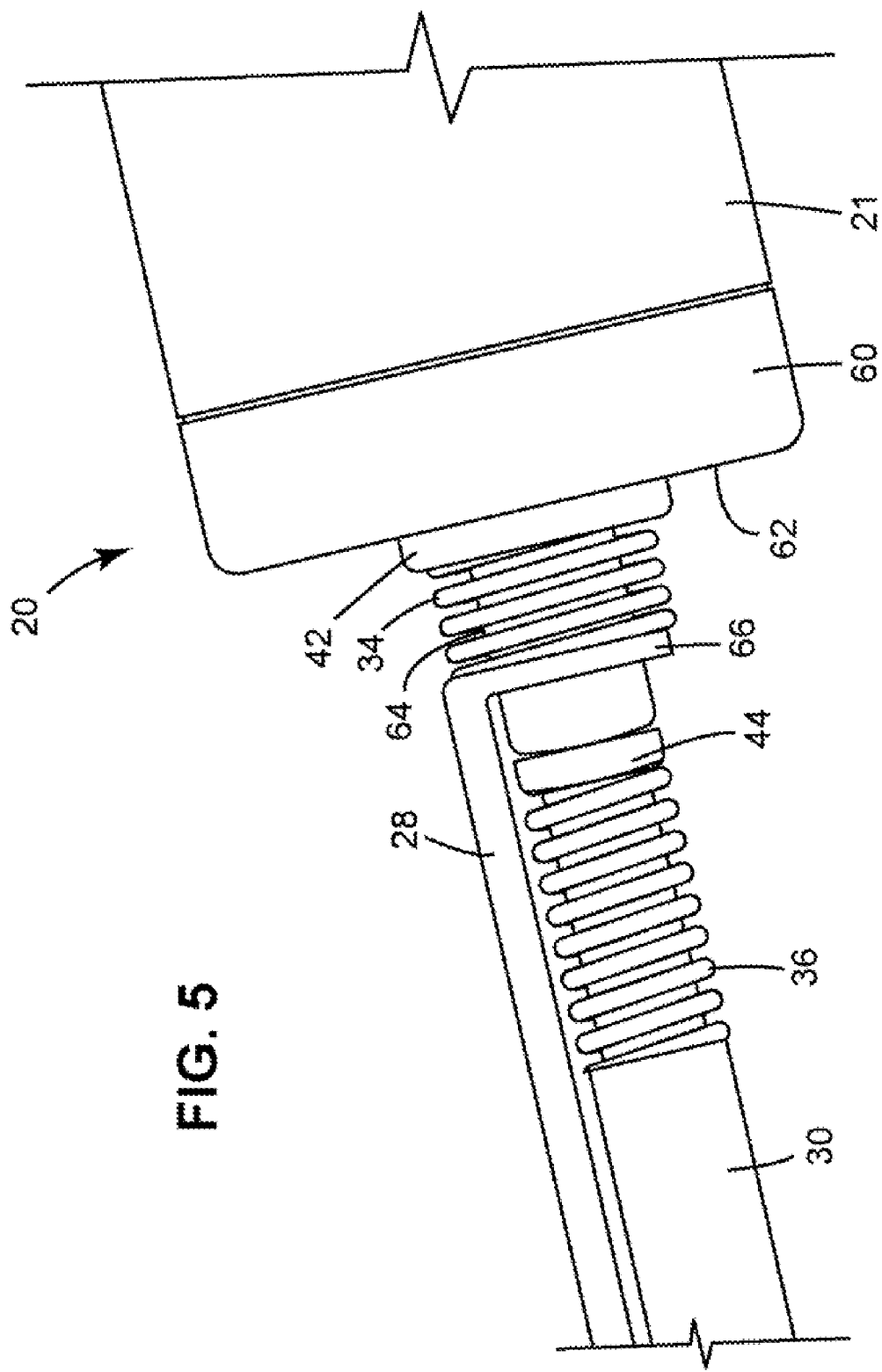
FIG. 5 is an enlarged schematic view of another section of the embodiment shown in FIG. 3.
Figure 6:
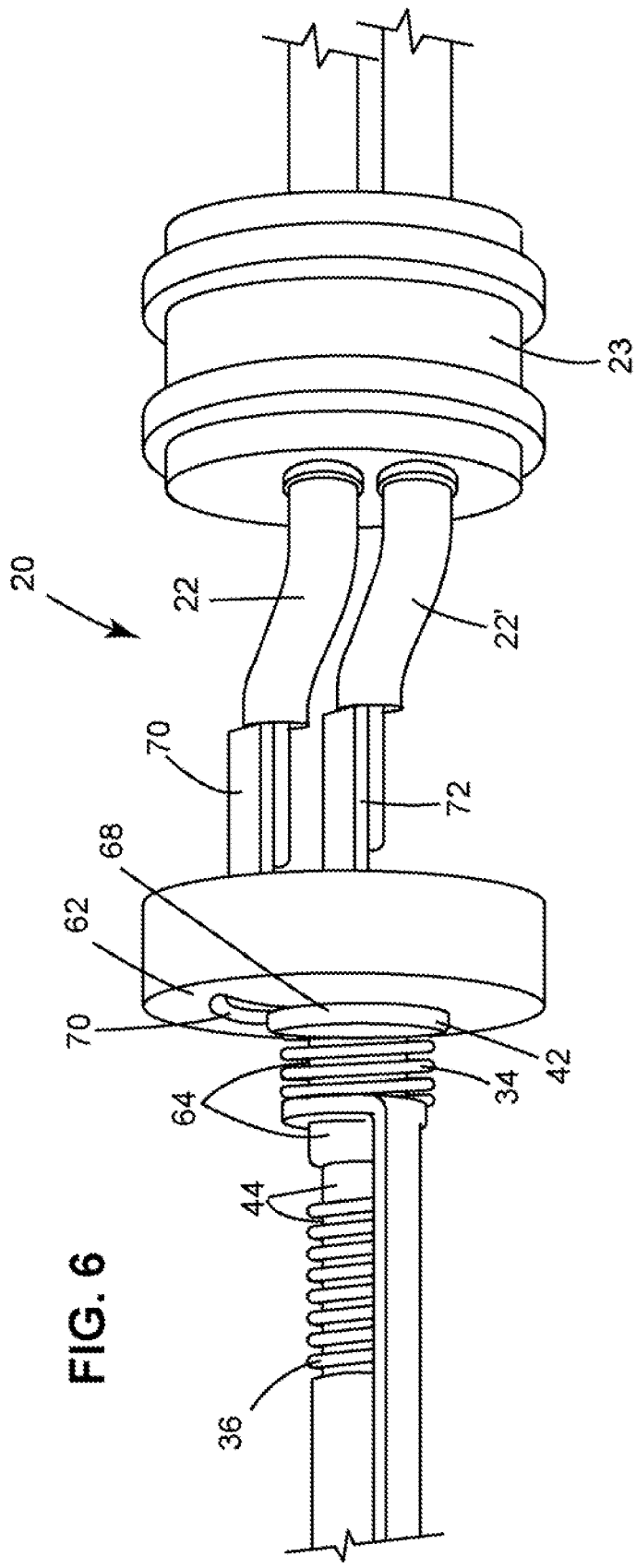
FIG. 6 is an enlarged cutaway schematic view showing one embodiment of electrical connections associated with a temperature sensor in accordance with the present invention.

Electrical contact 42, FIG. 5 is engaged with spring 34, and electrical contact 44 is engaged with spring 36. In one non-limiting example, electrical contact 44 and spring 36 may be engaged via compression, as better shown in FIG. 7. Electrical contact 44, FIG. 5 may also be connected to spring 36 by any other suitable connecting means such as by solder, braze, or a weld. Housing section 20 further includes spindle 60 with a seat 62 and post 64. Spring 34 is disposed about post 64. Pin 28 includes a proximate inwardly depending ring 66 disposed over post 64 and abutting spring 34. Electrical contact 42, FIG. 6 includes ring 68 disposed about post 64 under spring 34, and in one non-limiting example ring 68 and spring 34 are connected via a compression fit. Electrical contact 42 further includes tab 70 extending through seat 62. Electrical contact 44 fits within spring 36 and extends through post 64 and seat 62 terminating in tab 72. Housing section 20 further includes conductors 22 and 22' secured to tabs 70 and 72 of electrical contacts 42 and 44, respectively.

Figure 7:
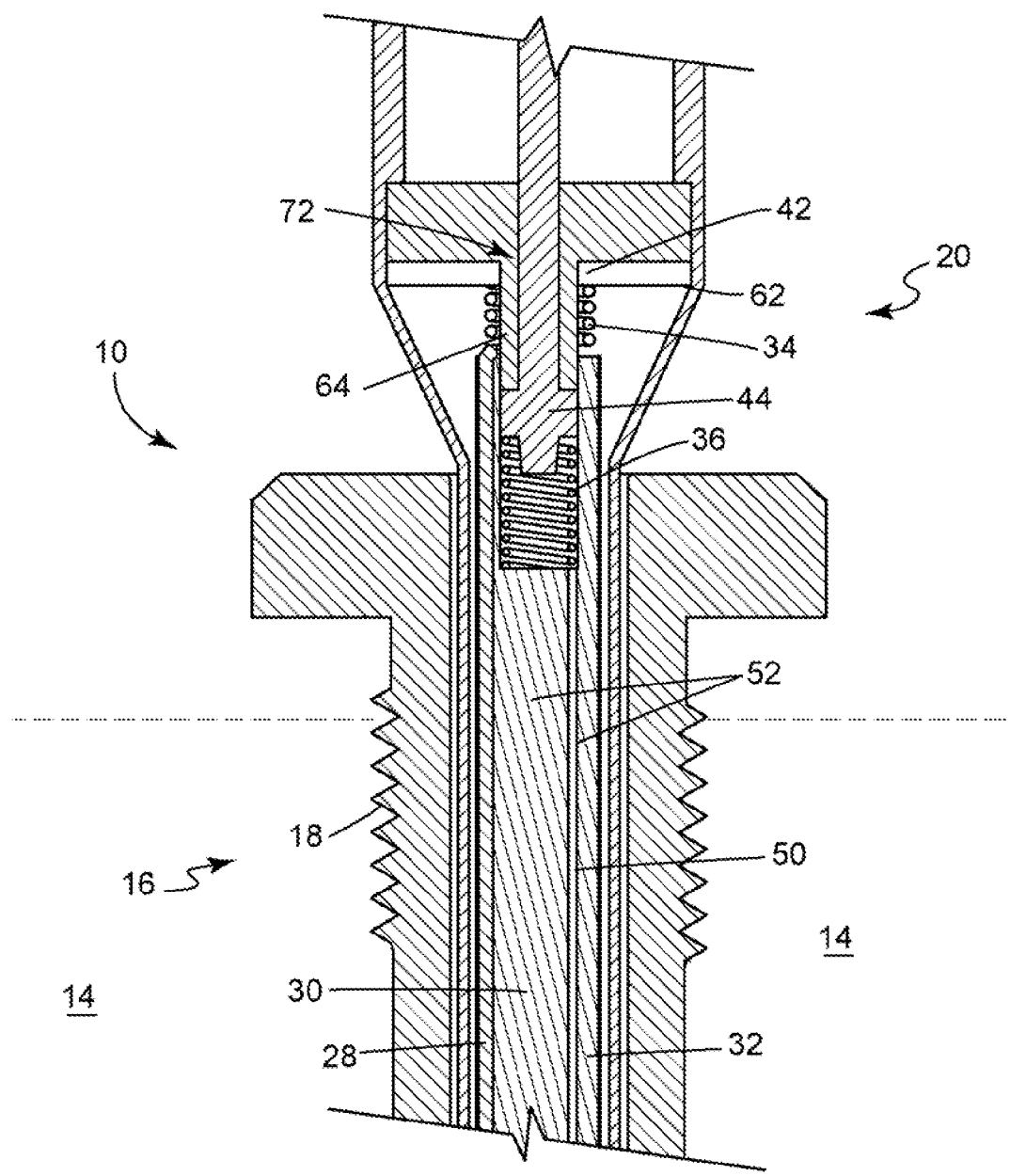
FIG. 7 is an enlarged schematic view of a section of the temperature sensor shown in FIG. 2.

In one embodiment pin 28, FIG. 7 is made of metal and pin 30 includes a conductive trace 50 within insulative shell 52. Conductive trace 50 and insulative shell 52 may be made of any suitable material but in one example conductive trace 50 is platinum and insulative shell 52 is ceramic. In one configuration post 64 is an insulative material such as steatite, but other materials such as alumina or mullite would be suitable. Tabs 70 and 72 may include, for example, a gold-plated base metal, or wire, a combination thereof, or any other suitable material.

Figure 8:
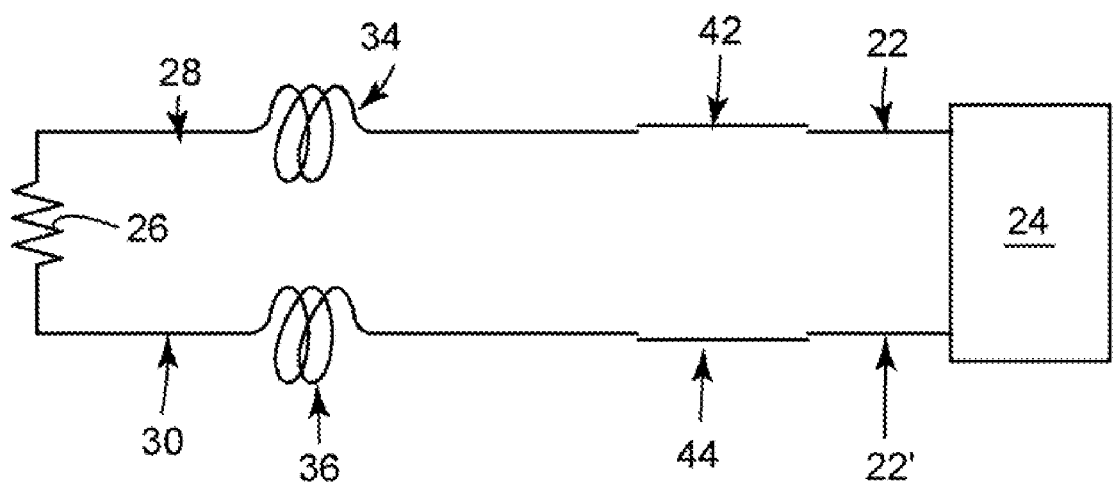
FIG. 8 is an electrical schematic of one embodiment of a temperature sensor in accordance with the present invention.

Accordingly, despite high temperatures and large temperature excursions, mechanical contact and electrical connection is maintained between thermistor 26, pin 28, spring 34, electrical contact 42 including tab 70, and conductor 22 connected to control or measurement circuitry 24, as shown in diagram form in FIG. 8. Mechanical and electrical contact is also maintained between thermistor 26, pin 30, spring 36, electrical contact 44 including tab 72, and conductor 22' also connected to control or measurement circuitry 24.

The embodiments of the applicant's invention thus provide an improved performance temperature sensor which is more robust and reliable and better able to withstand high temperatures and large variations in temperature, which may be used in many applications, including but not at all limited to the exhaust system motor vehicles or with fuel cells.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A temperature sensor comprising:
   a probe section for insertion into a hot zone, the probe section including:
   a thermistor,
   a first lengthy pin terminating at the thermistor, and
   a second lengthy pin also terminating at the thermistor; and
   a housing section on one end of the probe section and outside of the hot zone, the housing section including:
   a first spring which biases the first pin into contact with the thermistor,
   a second spring which biases the second pin into contact with the thermistor,
   a first electrical contact engaged with the first spring, and
   a second electrical contact engaged with the second spring.

2. The temperature sensor of claim 1 in which the first pin includes a distal inwardly depending seat for the thermistor.

3. The temperature sensor of claim 1 in which the first pin is made of metal.

4. The temperature sensor of claim 1 in which the first pin is made of a nickel, chromium and iron alloy.

5. The temperature sensor of claim 1 in which the second pin includes a conductive trace within an insulative shell.

6. The temperature sensor of claim 5 in which the conductive trace includes platinum.

7. The temperature sensor of claim 5 in which the insulative shell is made of ceramic material.

8. The temperature sensor of claim 1 in which the housing section includes a spindle with a seat and a post and the first spring is disposed about the post.

9. The temperature sensor of claim 8 in which the first pin includes a proximate inwardly depending ring disposed over the post abutting the first spring.

10. The temperature sensor of claim 9 in which the inwardly depending ring and the first spring are connected via a compression fit.

11. The temperature sensor of claim 9 in which the first electrical contact includes a ring disposed about the post under the first spring and a first tab extending through the seat.

12. The temperature sensor of claim 8 in which the second electrical contact fits within the second spring and extends through the post and the seat terminating in a second tab.

13. The temperature sensor of claim 12 in which the second spring and the second electrical contact are engaged via compression.

14. The temperature sensor of claim 12 in which the tabs include a gold-plated base metal.

15. The temperature sensor of claim 8 in which the post includes steatite.

16. The temperature sensor of claim 1 in which the housing section further includes first and second conductors secured to the first and second electrical contacts, respectively.

17. The temperature sensor of claim 16 in which the first and second conductors are wires.

18. The temperature sensor of claim 1 in which the thermistor is a negative temperature coefficient thermistor.

19. A temperature sensor comprising:
  a probe section including:
    a negative temperature coefficient thermistor,
    a first lengthy conductive pin terminating at the thermistor, and
    a second lengthy pin including a conductive trace within an insulative shell also terminating at the thermistor; and
  a housing section on one end of the probe section, the housing section including:
    a first spring which biases the first pin into contact with the thermistor,
    a second spring which biases the second pin into contact with the thermistor,
    a first electrical contact engaged with the first spring,
    a second electrical contact engaged with the second spring,
    a first conductor secured to the first electrical contact, and
    a second conductor secured to the second electrical contact.

20. A temperature sensor comprising:
  a probe section including:
    a thermistor,
    a first lengthy pin terminating at the thermistor including a proximate inwardly depending ring, and
    a second lengthy pin also terminating at the thermistor; and
  a housing section on one end of the probe section including:
    a first spring which biases the first pin into contact with the thermistor,
    a post disposed under the inwardly depending ring of the first pin and abutting the first spring,
    a second spring which biases the second pin into contact with the thermistor,
    a first electrical contact including a ring disposed about the post under the first spring, and
    a second electrical contact engaged with the second spring and extending through the post.

* * * * *